Feb. 14, 1928.
A. SMITH
CLUTCH CONTROL
Filed July 28, 1927
1,659,285
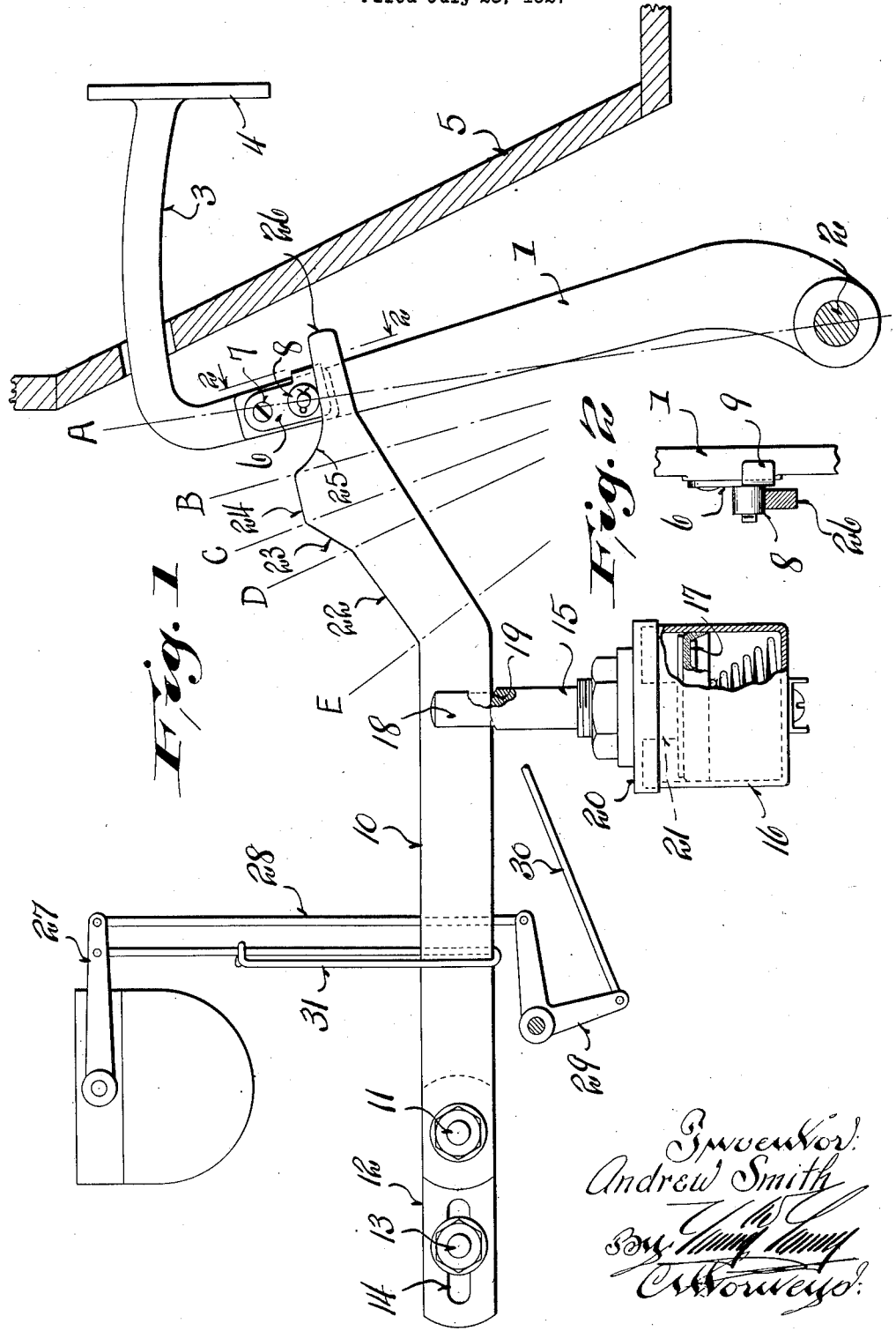

Patented Feb. 14, 1928.

1,659,285

UNITED STATES PATENT OFFICE.

ANDREW SMITH, OF MILWAUKEE, WISCONSIN.

CLUTCH CONTROL.

Application filed July 28, 1927. Serial No. 209,005.

This invention relates to clutch controls and is particularly directed to a clutch control for use on automobiles.

This invention is an improvement over that disclosed in my prior Patent No. 1,624,513 of April 12, 1927, for clutch controls, and has in general the same objects as those set forth in such patent.

Further objects are to provide a novel form of clutch control for use on automobiles which is so constructed that it is impossible to stall the engine in letting in the clutch, as for example, during shifting of the gears, and which is so constructed that not only is the closing of the clutch cushioned, but also the supply of fuel to the engine is automatically increased in a very gradual manner while the clutch is taking up the slack, and is also increased in a more rapid manner while the clutch is actually closing, so that the engine attains the requisite speed as the additional load is imposed thereon, so that stalling of the engine is wholly prevented.

Further objects are to provide a clutch control device in which relative adjustment of the parts may be very readily effected and the device thus made to accommodate itself to variations in the construction of automobiles with the minimum of change.

An embodiment of the invention is shown in the accompanying drawings in which:—

Figure 1 is a fragmentary view showing the clutch control and a fragment of the automobile;

Figure 2 is a detail taken on the line 2—2 of Figure 1.

Referring to the drawings, it will be seen that the clutch pedal is indicated by the reference character 1 and is rigidly carried by the shaft 2. It is provided with a projecting portion 3 equipped with a foot receiving member 4 and projecting through an aperture in the front board 5 of the automobile. This pedal 1 is provided with a small lever or flap 6 pivotally carried by means of the screw 7 and provided with a roller 8 adapted to contact with a cam surface hereinafter described. This small lever 6 is also provided with an inwardly turned tongue 9 which fits over the rear face of the clutch pedal 1 under normal conditions and on the back stroke of the clutch pedal, as will appear hereinafter.

A lever 10 is pivotally carried by means of the bolt 11 secured to the adjustable bracket 12. This bracket 12 may be attached to any suitable stationary portion of the automobile by means of the bolt 13, such bolt cooperating with an elongated slot 14 formed in the bracket. This bracket may be adjusted in or out, or may be tilted about the bolt 13 to thus elevate or lower the pivot point or bolt 11 of the main lever 10. This main lever is in reality a cushioning lever and cooperates with the plunger 15 of a cushioning device 16, similar to that disclosed in my above noted patent. This cushioning device is provided with a piston 17 slidably mounted within the main cylinder and retarding the downward motion of the plunger. The upper end of the plunger is slotted to provide a pair of arms 18 between which the lever 10 is received. The lower portion of this slot is provided with a rounded face 19 against which the lower face of the lever 10 contacts. The cushioning device is provided with a stop to limit the upward motion of the plunger 15. For example, the cap 20 of the device may be provided with an internal boss 21 which contacts with the upper face of the piston 17, as shown in dotted lines in Figure 1. It is to be noted that the piston 17 has its downward stroke retarded but may make a quick upward stroke when urged upwardly by means of the spring carried within the cushioning device.

The lever 10 is provided with a cam face, one portion of which, 22, has a gradual slant, the next portion of which, 23, has a rather abrupt slant and the upper portion 24 of which is approximately flat. From the portion 24, the cam face curves downwardly, as indicated at 25, to a projecting tongue 26. The purpose of these cam faces will be described hereinafter.

The throttle lever 27 of the fuel control is connected by means of the rod 28 with a bell crank 29 and from thence to the foot accelerator by means of the rod 30 in the usual manner. In addition to this, the throttle lever 27 has an elongated loop 31 formed in a link pivotally connected thereto and loosely surrounding the lever 10.

The lever 10, it will be seen from Figure 1, upon depression, will open the throttle. However, the throttle may be opened by the foot accelerator or hand lever in the usual manner, as the loop 31 will merely move downwardly freely with reference to the lever 10. It is the usual practice, of course, to provide a stop for the closing motion of the throttle lever 27. Such stop has not been shown as it is of conventional construction. The position of the parts shown in Figure 1 is for maximum or limited closing motion of the throttle lever and in the condition of the parts shown in such figure, the throttle lever is at its limit of closing motion and the cushioning device is at its limit of upward motion and the clutch is in closed position.

It is to be noted that the center line joining the cam follower center 8 and the center of the shaft 2, is indicated by the reference character A. Successive positions of this line are indicated by the reference characters B, C, D, and E.

Upon opening motion of the clutch lever, the small link 6 rocks about its pivot point and depression of the lever 10 does not occur. However, when the clutch pedal is released and allowed to move to clutch closing position, the lever or link 6 swings into its normal position, as shown in Figure 1, with reference to the clutch pedal 1. However, this clutch pedal is at the line E and consequently inward motion of the clutch pedal causes the roller 8 to travel upon the sloping surface 22 of the cam face of the lever 10. This causes a slight depression of the cushioning device and a slight opening of the throttle. When the clutch lever or clutch pedal arrives at the line D, all of the slack in the clutch is just taken up and the clutch begins to engage. At this point, the roller 8 travels upon the surface 23 which is a steeper cam surface. This causes further depression of the cushioning device during the closing motion of the clutch and further opens the throttle valve, thus accelerating the engine as the load comes thereon. The motion, however, is not sudden due to the cushioning device, but is very gradual and even. Consequently, the clutch closes and the engine is also automatically accelerated by the closing motion of the clutch pedal in a very even and effective manner. When the roller 8 arrives at the portion 24 of the cam face of the cushioning lever 10, the throttle valve is held at its predetermined position for partial acceleration of the engine and if desired, the operator may hold his foot upon the clutch lever and keep it between the lines C and B. Under these conditions, the normal setting of the control or throttle valve is such that the automobile travels at approximately twenty miles an hour when in high gear. If desired, the operator may allow the clutch lever to swing to its extreme rear position under which condition the roller 8 will travel along the surface 25 of the cam face and allow the lever 10 to move into the position shown in Figure 1. This corresponds to idling speed of the engine or minimum speed thereof.

From actual tests conducted with this device it has been found that it is wholly impossible to stall the engine during closing of the clutch, as in shifting the gears, for instance. Instead, the engine is automatically accelerated as the clutch closes, so that as the load is applied to the engine its speed is increased to take care of additional load. In addition to this, no thought is required on the part of the operator to secure these results, as the operations are wholly automatic.

The purpose of the portion 24 of the cam face is two-fold. On the one hand, it permits control of the engine by means of the clutch pedal alone, without the use of the foot accelerator. As stated above the operator may just catch the clutch pedal when the portion 8 is upon the portion 24. This occurs after complete closing of the clutch and holds the throttle valve at the desired point corresponding to a predetermined speed, such for example, as twenty miles an hour. If the operator desires to open the clutch, he merely presses the clutch lever forwardly or inwardly, thus opening the clutch and automatically cutting down the speed of the engine, thereby preventing racing thereof.

Another purpose of the portion 24 is that it provides a certain amount of additional stock so that the cam face 23 may be varied by filing or cutting it away as needed for different types of engines and clutches.

It is clear that a highly practical and eminently effective construction has been illustrated, whereby an automatic control of the throttle and of the closing of the clutch is secured.

It will be seen further that the apparatus may be applied to existing types of automobiles with a minimum of change.

Although the invention has been described in considerable detail, such description is intended as illustrative rather than limiting as the invention may be variously embodied and as the scope of such invention is to be determined as claimed.

I claim:

1. In an automobile, the combination of a clutch pedal, a lever operated by said clutch pedal when said pedal is moved to clutch closing position, a throttle control opened by said lever when said lever is moved by the clutch closing movement of said clutch pedal, and an adjustable pivotal support for said lever.

2. In an automobile, the combination of a clutch pedal, a lever having a cam face adjacent said clutch pedal, a swinging member carried by said clutch pedal and adapted to engage said cam face when said clutch pedal moves to clutch closing position to thereby operate said lever, said member freely swinging out of the way when said clutch pedal is moved to clutch open position, and a throttle control operated by said lever and opened when said lever is moved due to the clutch closing movement of said clutch pedal.

3. In an automobile, the combination of a clutch pedal, a lever having a cam face adjacent said clutch pedal, a swinging member carried by said clutch pedal and adapted to engage said cam face when said clutch pedal moves to clutch closing position to thereby operate said lever, said member freely swinging out of the way when said clutch pedal is moved to clutch open position, and a throttle control operated by said lever and opened when said lever is moved due to the clutch closing movement of said clutch pedal, said cam face having a flat portion on which said member may rest when said clutch pedal is held part way in.

4. In an automobile, the combination of a clutch pedal, a lever having a cam face adjacent said clutch pedal, a swinging member carried by said clutch pedal and cooperating with said cam face to depress said lever when said clutch pedal moves to clutch closing position, said member freely swinging out of the way when said clutch pedal is moved to clutch opening position, means for retarding the depression of said lever to retard the clutch closing motion of said clutch pedal, and a throttle control connected to said lever and opened when said lever is depressed.

In testimony that I claim the foregoing I have hereunto set my hand at Milwaukee, in the county of Milwaukee and State of Wisconsin.

ANDREW SMITH.